US005938323A

United States Patent [19]

McMahan

[11] Patent Number: 5,938,323

[45] Date of Patent: Aug. 17, 1999

[54] PROJECTOR LIGHT ASSEMBLY

[75] Inventor: Robert T. McMahan, Schaumburg, Ill.

[73] Assignee: Cooper Automotive Products, Inc., Houston, Tex.

[21] Appl. No.: 08/735,557

[22] Filed: Oct. 23, 1996

Related U.S. Application Data

[60] Provisional application No. 60/018,323, May 24, 1996.

[51] Int. Cl.[6] .......... B60Q 1/04

[52] U.S. Cl. .......... 362/539; 362/517; 362/519

[58] Field of Search .......... 362/517, 519, 362/538, 539, 303

[56] References Cited

U.S. PATENT DOCUMENTS

| | | | |
|---|---|---|---|
| 4,513,356 | 4/1985 | Mikola | 362/226 |
| 4,679,128 | 7/1987 | Duyn et al. | 362/306 |
| 4,731,713 | 3/1988 | Perthus | 362/302 |
| 4,771,372 | 9/1988 | Litetar et al. | 362/307 |
| 4,772,987 | 9/1988 | Kretschmer et al. | 362/61 |
| 4,800,467 | 1/1989 | Lindae et al. | 362/61 |
| 5,041,948 | 8/1991 | Krieg et al. | 362/61 |
| 5,119,276 | 6/1992 | Suzuki | 362/61 |
| 5,130,902 | 7/1992 | Schmid et al. | 362/61 |
| 5,193,894 | 3/1993 | Lietar et al. | 362/66 |
| 5,307,246 | 4/1994 | Schmid et al. | 362/61 |
| 5,307,247 | 4/1994 | Cejnek | 362/61 |
| 5,321,586 | 6/1994 | Hege et al. | 362/32 |
| 5,373,423 | 12/1994 | Liedtke et al. | 362/61 |
| 5,408,216 | 4/1995 | Klaiber et al. | 340/479 |

OTHER PUBLICATIONS

Drawing of fog lamp that is believed to have been sold by Robert Bosch GmbH more than one year before the May 24, 1996 filing date of U.S. Provisional Application No. 60/018,323.

*Primary Examiner*—Stephen Husar
*Attorney, Agent, or Firm*—Fish & Richardson PC

[57] ABSTRACT

A projector light assembly includes a primary reflector having a proximal end and a distal end and a lens positioned distally of the distal end of the reflector. The assembly also includes a shade plate configured to prevent light reflected by a first section of the primary reflector from reaching a first portion of the lens (e.g., a portion of the lens above a horizontal axis of the lens). An auxiliary reflector attached to the shade plate reflects light reflected by a second section of the primary reflector so as to direct the reflected light toward the first portion of the lens.

26 Claims, 7 Drawing Sheets

BEAM PATTERN

PROJECTOR LIGHT ASSEMBLY

CROSS REFERENCE TO RELATED APPLICATIONS

This application claims priority from U.S. Provisional Application Serial No. 60/018,323, entitled "Projector Light Assembly" and filed May 24, 1996, which is incorporated by reference.

BACKGROUND OF THE INVENTION

The invention is directed to a projector light assembly.

Projector light assemblies are used, for example, as fog lamps or head lamps in automobiles and other vehicles. Typically, a projector light assembly includes a lamp positioned at the base of a reflector. The reflector focuses light produced by the lamp and directs the light through a lens to produce a beam of light for use by the driver of the vehicle.

Projector light assemblies often include an aperture positioned between the reflector and the lens. The aperture is defined by a shade that blocks a portion of the light from the reflector to control the beam pattern of the beam of light produced by the assembly. For example, the shade may be used to block all light from the reflector that would be projected above the horizontal axis of the projector light assembly. This is important, for example, to prevent significant light from a fog lamp or headlight from being directed into the eyes of an oncoming driver.

A projector light assembly may be configured to produce a beam pattern that includes a small portion of light projected above the horizontal axis. The light projected above the horizontal axis permits a driver of a vehicle that includes the projector light assembly to see signs and other objects without creating the hazardous situations that could result from directing a large amount of light above the horizontal axis and into the eyes of oncoming drivers. In one approach to producing a beam pattern having a small portion of light projected above the horizontal axis, a projector light assembly includes a reflector positioned next to the lens and aligned with the horizontal axis to reflect a small portion of light above the horizontal axis.

SUMMARY OF THE INVENTION

The invention features a projector light assembly that is configured to produce a beam pattern that includes a small portion of light projected above the horizontal axis. The light assembly includes a shade that blocks light reflected from the bottom portion of a reflector to prevent a substantial amount of light from extending above the horizontal axis. To produce the small portion of light that is projected above the horizontal axis, the light assembly includes an auxiliary reflector that reflects a portion of the light reflected from the top of the reflector so as to cause that portion of the light to extend above the horizontal axis. The auxiliary reflector is attached to the shade. This attachment provides effective and consistent alignment of the auxiliary reflector with the shade.

The light assembly also includes a plastic clip that interacts with a socket structure on the body of the light assembly and a flange on a lamp unit to provide a latching mechanism. The latching mechanism permits quick and accurate placement of the lamp unit within the lighting assembly and thereby permits insertion and removal of the lamp unit from the lighting assembly without using tools. Moreover, the plastic clip and the socket structure may be produced and assembled at low cost.

In one aspect, generally, the invention features a projector light assembly. The assembly includes a primary reflector having a proximal end and a distal end. A lens is positioned distally of the distal end of the reflector. The assembly also includes a shade plate configured to prevent light reflected by a first section of the primary reflector from reaching a first portion of the lens as well as an auxiliary reflector configured to reflect light reflected by a second section of the primary reflector so as to direct the reflected light toward the first portion of the lens. The auxiliary reflector is attached to the shade.

Embodiments of the projector light assembly may include one or more of the following features.

The auxiliary reflector may include a reflective first surface that reflects light from the second section of the primary reflector and a second surface that prevents light reflected by a third section of the primary reflector from reaching the first portion of the lens. The first portion of the lens may be the portion of the lens above a horizontal axis of the lens.

The shade and the auxiliary reflector may be positioned between the distal end of the primary reflector and the lens. The auxiliary reflector and the shade may be formed from a single piece of material.

The light assembly may also include a lamp unit configured to produce light and direct the light toward the primary reflector.

A socket for insertion of the lamp unit may be surrounded by socket structure that, together with a plastic clip, defines a latching mechanism. The clip may be attached to the socket structure with tabs extending from the clip positioned in apertures of the socket structure.

The lamp unit may include a flange and may be secured in the socket by positioning the flange in a circular slot defined by the clip and the socket structure. The flange may include extensions having different shapes and the clip may include an aperture shaped to receive the flange and the extensions thereof.

The circular slot may include one or more stops for limiting a range of rotational movement of the flange of the lamp unit in the circular slot. The circular slot may also include one or more ramps in the circular slot to allow rotational movement of the flange of the lamp unit in the circular slot in one direction while resisting rotational movement of the flange in an opposite direction.

In another aspect, generally, the invention features a projector light assembly that includes a primary reflector having a proximal end and a distal end, a lens positioned distally of the distal end of the reflector, and a shade plate configured to prevent light reflected by a first section of the primary reflector from reaching a first portion of the lens. The assembly also includes a socket for insertion of a lamp unit, socket structure positioned around the socket, and a clip positioned relative to the socket structure so that the clip and the socket structure together define a latching mechanism.

Embodiments of the projector light assembly may include one or more of the features discussed above.

Other features and advantages will become apparent from the following description, including the drawings, and from the claims.

DESCRIPTION OF THE PREFERRED EMBODIMENTS

Figure 3:
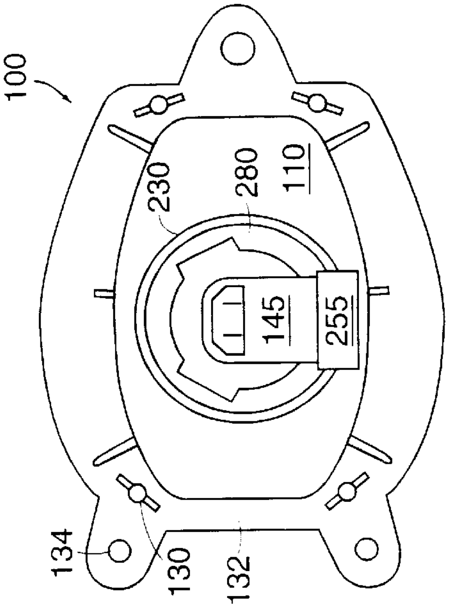
FIGS. 1–4 are, respectively, side, front, rear and top views of a lighting assembly.
Figure 2:
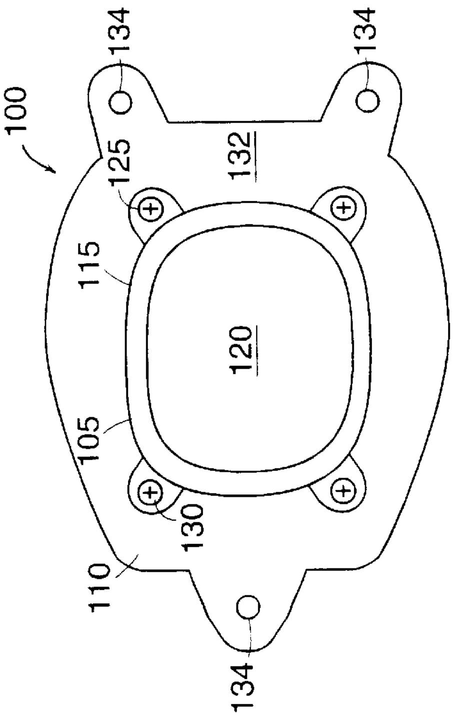
Figure 1:
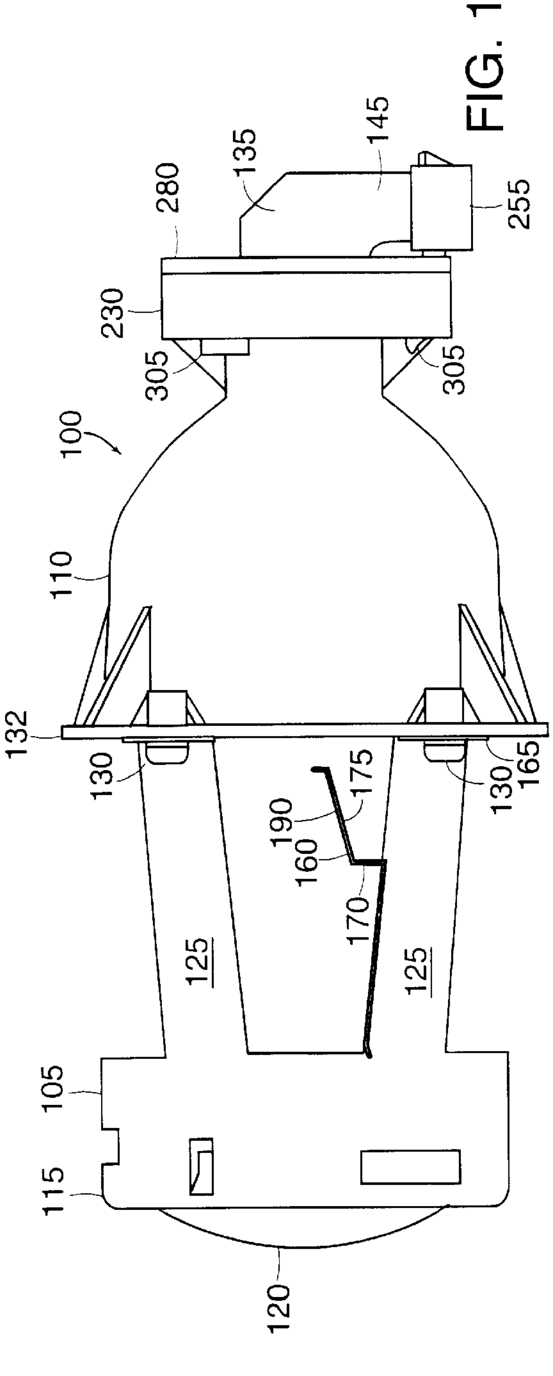
Figure 4:
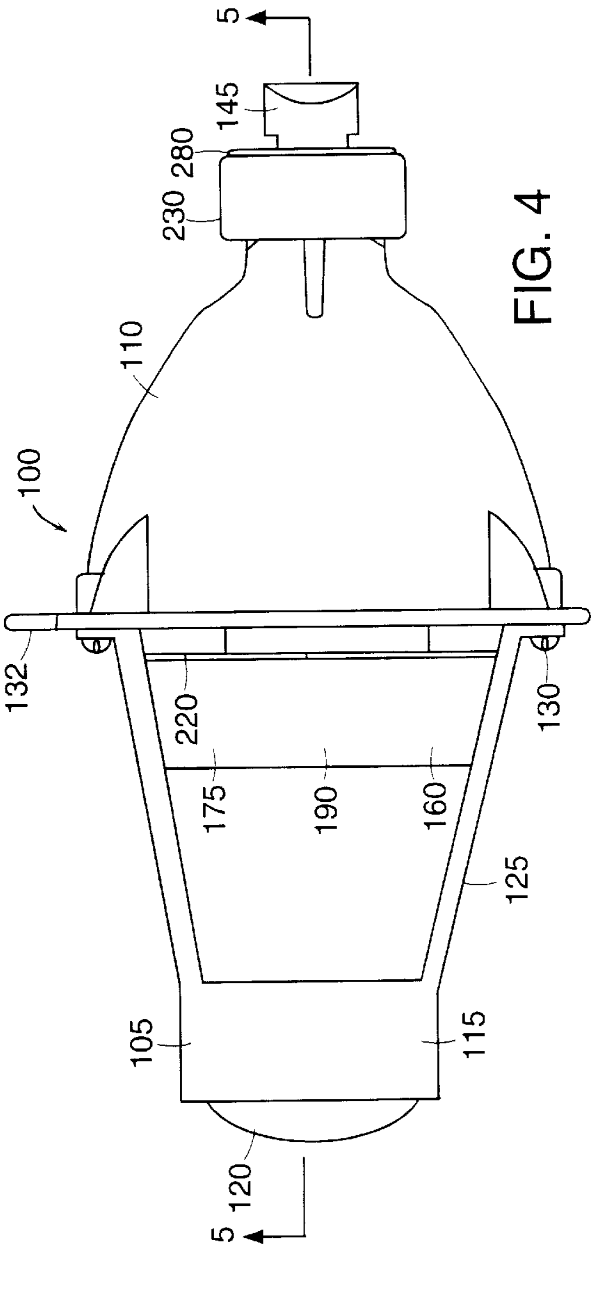
Figure 5:
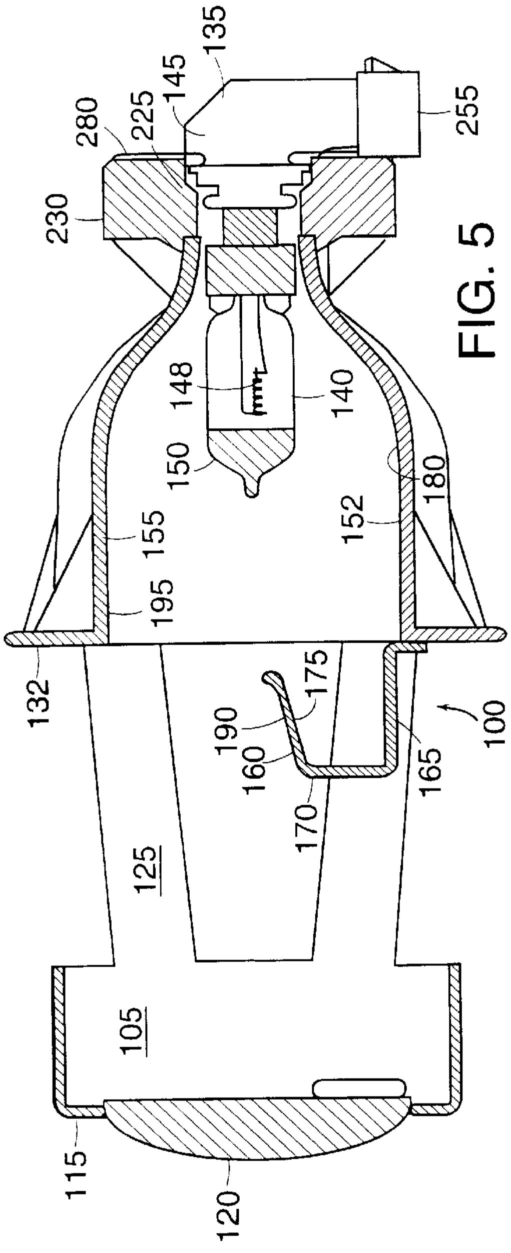
FIG. 5 is a sectional view of the lighting assembly of FIGS. 1–4 taken along section 5—5 of FIG. 4.
Figure 6:
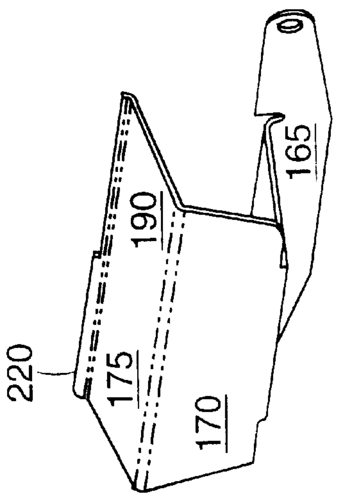
FIGS. 6–9 are, respectively, perspective, side, top and front views of a light shield of the lighting assembly of FIGS. 1–4.
Figure 7:
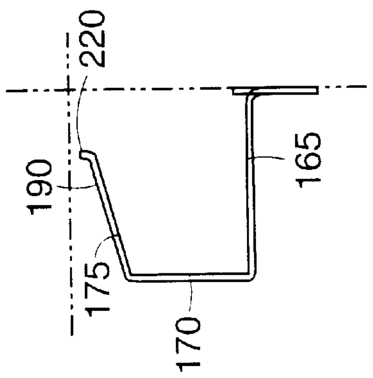
Figure 8:
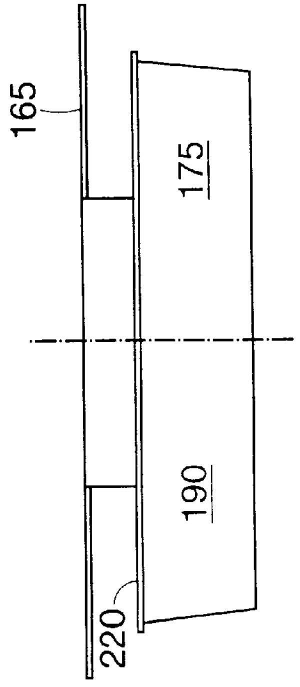
Figure 9:
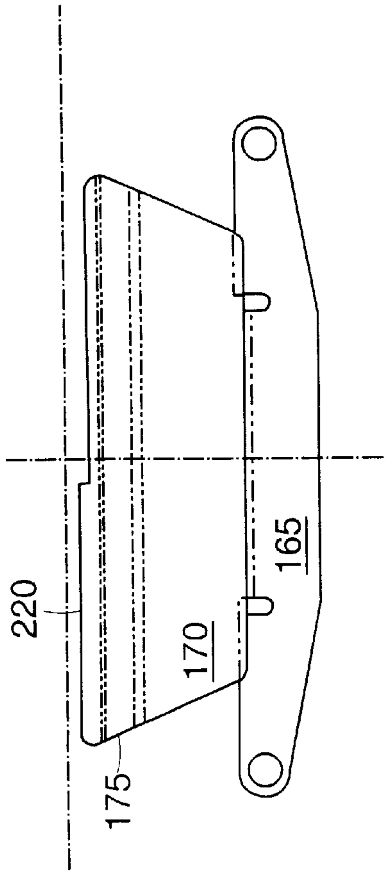

FIGS. 1–5 illustrate a projection light assembly 100. The assembly 100 includes a lens holder 105 attached to an end of a body 110. The lens holder 105 includes a cup 115 that holds a lens 120. Four support legs 125 extend from the cup 115 to the body 110. Each support leg is attached to the body by a screw 130. The body 110 includes a mounting flange 132 having mounting holes 134 for attachment of the projection light assembly to a housing in a vehicle (not shown).

A lamp unit 135 is secured to the body 110 at the end of the body opposite the lens holder 105. The lamp unit 135 includes a lamp 140 and a plug body 145. The lamp 145 includes a filament 148 that produces light and an opaque end piece 150 that prevents light from the filament from travelling directly from the lamp 140 to the lens 120. Instead, light from the lamp 140 reflects from an inner reflective surface 152 of a reflector 155 positioned in the body 110 before reaching the lens 120.

Referring also to FIGS. 6–9, a light shield 160 is positioned between the reflector 155 and the lens 120. The light shield includes a mounting bracket 165, a shading plate 170, and a auxiliary reflector 175. The mounting bracket 165 is generally L-shaped and is attached to the body 110 by a pair of the screws 130. The mounting bracket 165 extends from the body 110 toward the cup 115 of the lens holder 105. The shading plate 170 is connected to the other end of the mounting bracket 165 and forms a 90 degree angle with the mounting bracket. The auxiliary reflector 175 is connected to the shading plate 170. The auxiliary reflector extends from the shading plate toward the body 110 and forms an angle of about 105° with the shading plate.

Figure 10:
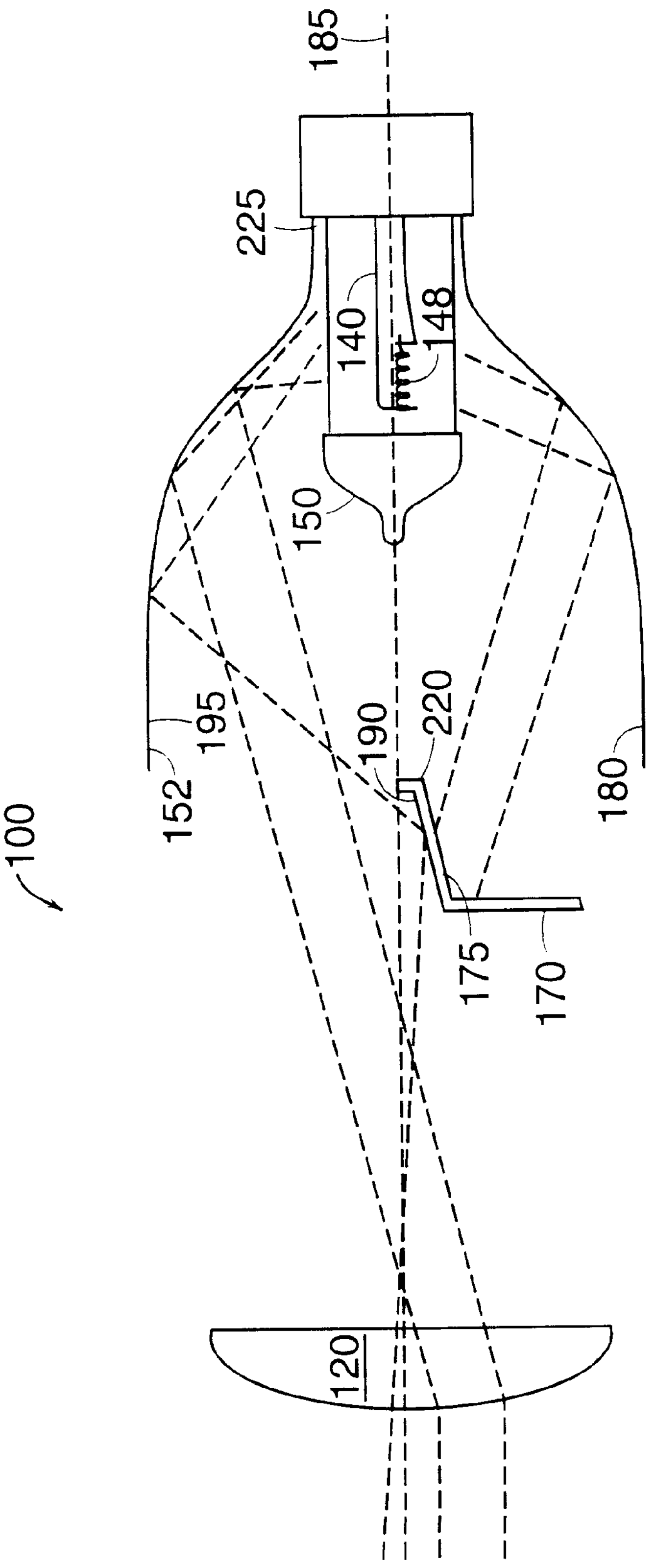
FIG. 10 is a diagram showing paths on which light travels in the lighting assembly of FIGS. 1–4.

Referring also to FIG. 10, the shading plate 170 and the auxiliary reflector 175 are oriented relative to the reflector 155 and the lens 120 so as to block light reflected from a bottom surface 180 of the reflector. Since this light would pass through the lens at an angle directed above the horizontal axis 185 of the assembly 100, the shading plate 170 and the auxiliary reflector 175 serve to prevent the light beam produced by the assembly 100 from having a significant portion that extends above the horizontal axis 185. This, in turn, prevents hazardous conditions that could result from having a significant amount of light directed into the eyes of the drivers of oncoming vehicles.

However, it is useful for the beam pattern of the light beam produced by the assembly 100 to have a small portion that extends above the horizontal axis 185. Such light serves, for example, to illuminate signs. For this purpose, the auxiliary reflector 175 includes a reflective upper surface 190. The surface 190 receives a small portion of the light reflected from the upper surface 195 of the reflector 155. The surface 190 directs that light upward so that the light exits the lens 120 above the horizontal axis 185.

Figure 11:
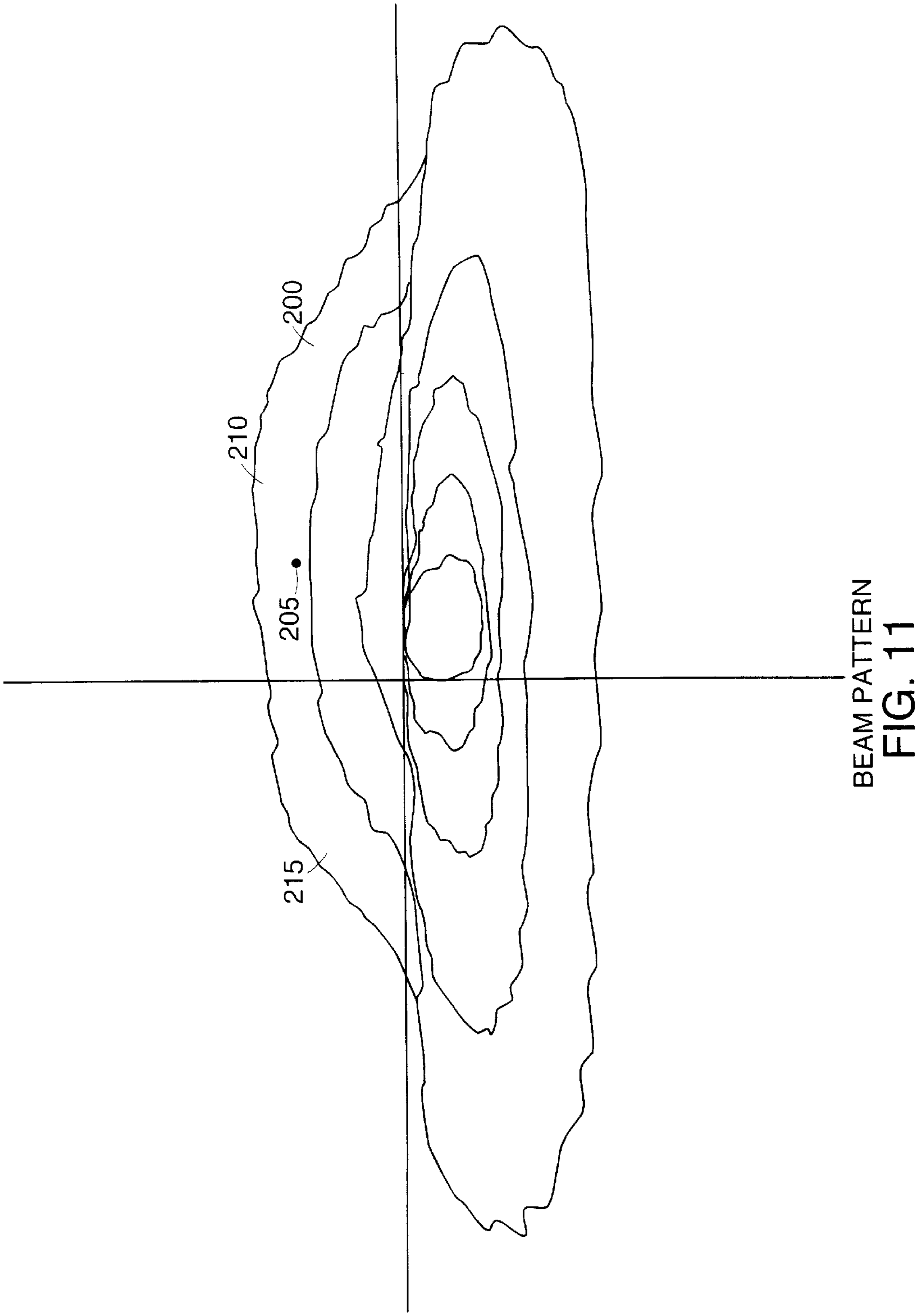
FIG. 11 is a graph of the beam pattern produced by the lighting assembly of FIGS. 1–4.
Figure 12:
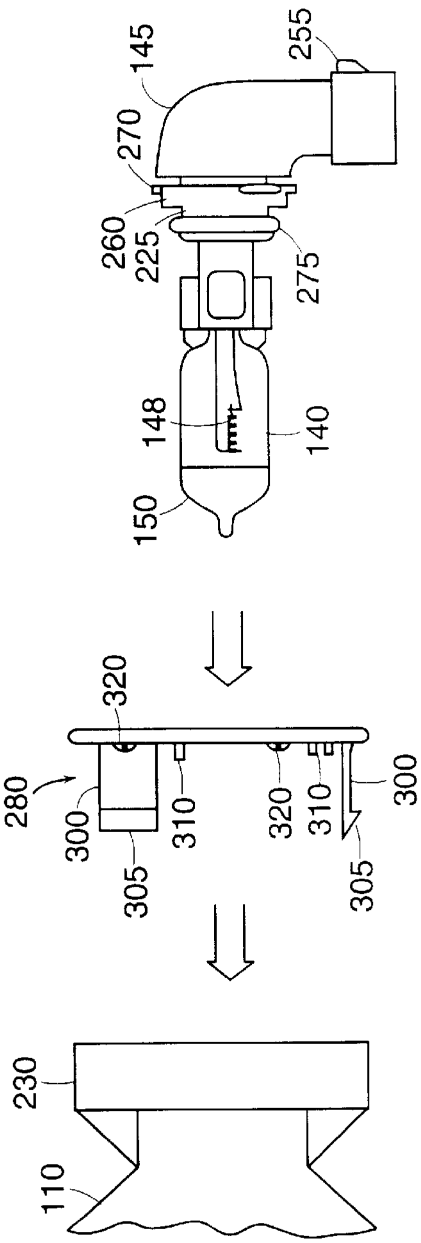
FIG. 12 is an exploded side view of a latching mechanism and a lamp unit of the light assembly of FIGS. 1–4.
Figure 16:
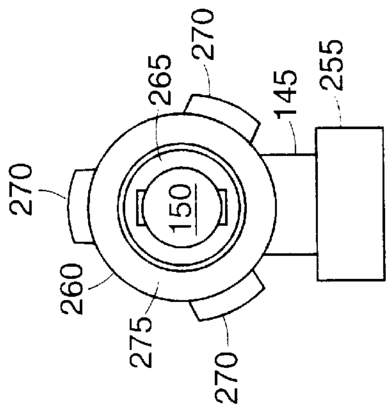
FIG. 16 is an end view of a lamp unit of the lighting assembly of FIGS. 1–4.
Figure 15:
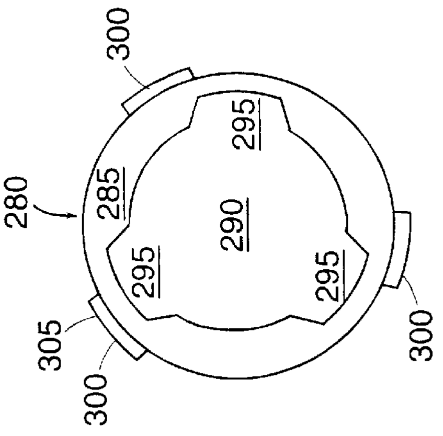
FIG. 15 is an end view of a plastic clip of the latching mechanism of FIG. 12.
Figure 13:
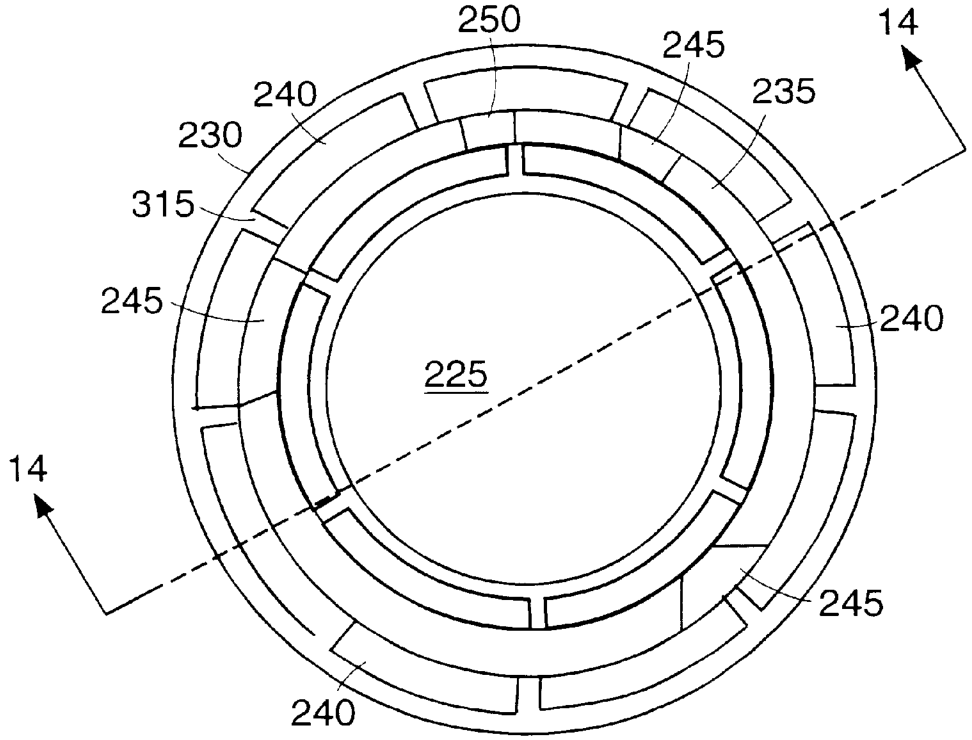
FIG. 13 is an end view of a socket of the latching mechanism of FIG. 12.
Figure 14:
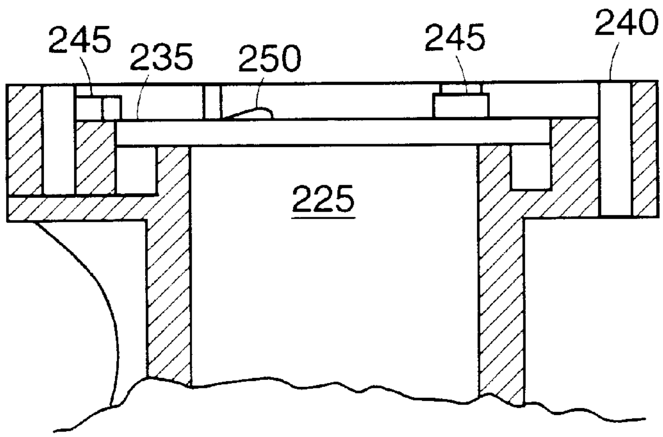
FIG. 14 is a sectional view of the socket of FIG. 13 taken along section 14—14 of FIG. 13.

Light assembly 100 produces the beam pattern 200 illustrated in FIG. 11. The beam pattern 200 includes a small portion 205 that extends above the horizontal axis. The portion 205 includes component 210 on the right side of the vertical axis that is larger than a component 215 on the left side thereof. This difference results from a lip 220 on the left side of auxiliary reflector 175. The lip 220 blocks a portion of the light that would otherwise be incident on left side of the upper reflective surface 190 of the auxiliary reflector 175 so that a larger amount of light is incident on the right side and reflected thereby.

Referring also to FIGS. 12–16, a latching mechanism that includes a socket structure 230 and a plastic clip 280 holds the lamp unit 135 in a socket 225 at the end of the body 110. The socket structure 230 is formed around the socket and extends outward in a direction perpendicular to the socket. The socket structure 230 has a circular slot 235 and three apertures 240 that are equidistant from one another. The socket structure also has stops 245 and a ramp 250 in the circular slot. The stops 245 limit the degree of rotation of the lamp unit 135 around the circular slot 235. The ramps 250 provides a resistance to rotation around the circular slot in one direction.

As noted, the lamp unit 135 includes the lamp 140 and the plug body 145. The lamp 140 is sized for insertion into the socket 225 so that light from the lamp is incident on the inner reflective surface 152 of the reflector 155.

The plug body 145 is connected to the lamp 140 at a first end and includes a power connector 255 at its opposite end. The power connector 255 may be connected to a standard power supply for operating the lamp 140.

The plug body also includes a flange 260 between the lamp 140 and the power connector 255. The flange extends from the plug body in a direction perpendicular to the plug body. The portion 265 of the plug body between the lamp and the plug body is configured for axial insertion into the socket. The flange 260, however, has an outer diameter greater than the diameter of the socket 225 and, therefore, limits the distance that the plug body may be inserted into the socket.

Three tabs 270 extend outward from the flange 260 in the same direction as the flange. The three tabs are equidistant from one another, and are of different sizes or shapes to aid alignment of the plug body in the socket. The tabs are adapted to be rotatably moveable within the circular slot 235 of the socket structure 230.

A channel is formed in the plug body 145 between the lamp 140 and the plug body flange 260. An elastomer O-ring 275 is disposed in the channel to provide a seal between the plug body and the socket when the plug body is positioned in the socket.

A plastic clip 280 includes a ring 285 having a central aperture 290. The aperture 290 is sized to receive the plug body 145, including the plug body flange 260. The aperture 290 also includes three notched passages 295 for receiving the tabs 265 of the plug body flange. Each notched passage 295 matches a corresponding tab 265 in size and shape. This arrangement allows for easy alignment of the tabs, and thus the plug body, with the plastic clip and the socket.

The plastic clip 280 also includes three legs 300 extending from the ring 285. The end 305 of each leg 300 is adapted to snap fit into an aperture 240 in the socket structure 230.

The plastic clip 280 includes keys 310 extending from the ring 285 in the same direction as the legs 300. These keys may be positioned in key holes 315 formed in the socket structure 230 to assist in aligning the plastic clip with the socket structure and to prevent rotational movement of the plastic clip.

The plastic clip also includes bumps 320 extending from the ring 285 in the same direction as the legs 300. These bumps apply a slight compressive force on the tabs 270 of the plug body flange when the bumps are aligned with the tabs. As a result, the tabs are restrained from further rotational movement.

Other embodiments are within the following claims.

What is claimed is:

1. A projector light assembly comprising:

a primary reflector having a proximal end and a distal end;

a lens positioned distally of the distal end of the reflector;

a shade plate configured to prevent light reflected by a first section of the primary reflector from reaching a first portion of the lens; and an auxiliary reflector configured to reflect light reflected by a second section of the primary reflector so as to direct the reflected light toward the first portion of the lens, the auxiliary reflector being attached to the shade;

wherein the auxiliary reflector includes a reflective first surface that reflects light from the second section of the primary reflector and a second surface that prevents light reflected by a third section of the primary reflector from reaching the first portion of the lens.

2. The projector light assembly of claim 1, wherein the first portion of the lens is a portion of the lens above a horizontal axis of the lens.

3. The projector light assembly of claim 1, wherein the shade and the auxiliary reflector are positioned between the distal end of the primary reflector and the lens.

4. The projector light assembly of claim 1, wherein the auxiliary reflector and the shade are formed from a single piece of material.

5. The projector light assembly of claim 1, further comprising a lamp unit configured to produce light and direct the light toward the primary reflector.

6. The projector light assembly of claim 1, further comprising a socket for insertion of a lamp unit.

7. The projector light assembly of claim 6, further comprising socket structure positioned around the socket.

8. The projector light assembly of claim 6, further comprising a latching mechanism that includes the socket structure and a clip.

9. The projector light assembly of claim 8, wherein the clip is made from plastic.

10. The projector light assembly of claim 8, further comprising apertures in the socket structure and tabs extending from the clip, wherein the clip is attached to the socket structure with the tabs positioned in the apertures.

11. The projector light assembly of claim 8, further comprising a lamp unit positioned in the socket and configured to produce light and direct the light toward the primary reflector.

12. The projector light assembly of claim 11, wherein the lamp unit includes a flange and wherein the lamp unit is secured in the socket by positioning the flange between the clip and the socket structure.

13. The projector light assembly of claim 12, wherein the flange of the lamp unit includes extensions having different shapes and wherein the clip includes an aperture shaped to receive the flange of the lamp unit and the extensions thereof.

14. The projector light assembly of claim 8, wherein the socket structure and the clip together define a circular slot.

15. The projector light assembly of claim 14, wherein the socket structure further includes at least one stop in the circular slot for limiting a range of rotational movement of a component of a lamp unit in the circular slot.

16. The projector light assembly of claim 14, wherein the socket structure further includes at least one ramp in the circular slot to allow rotational movement of a component of a lamp unit in the circular slot in one direction while resisting rotational movement of the component in an opposite direction.

17. A projector light assembly comprising:

a primary reflector having a proximal end and a distal end;

a lens positioned distally of the distal end of the reflector;

a shade plate configured to prevent light reflected by a first section of the primary reflector from reaching a first portion of the lens;

an auxiliary reflector configured to reflect light reflected by a second section of the primary reflector so as to direct the reflected light toward the first portion of the lens;

a socket for insertion of a lamp unit;

socket structure positioned around the socket; and a clip positioned relative to the socket structure so that the clip and the socket structure together define a latching mechanism.

18. The projector light assembly of claim 17, wherein the clip is made from plastic.

19. The projector light assembly of claim 17, further comprising apertures in the socket structure and tabs extending from the clip, wherein the clip is attached to the socket structure with the tabs positioned in the apertures.

20. The projector light assembly of claim 17, further comprising a lamp unit positioned in the socket and configured to produce light and direct the light toward the primary reflector.

21. The projector light assembly of claim 20, wherein the lamp unit includes a flange and wherein the lamp unit is secured in the socket by positioning the flange between the clip and the socket structure.

22. The projector light assembly of claim 21, wherein the flange of the lamp unit includes extensions having different shapes and wherein the clip includes an aperture shaped to receive the flange of the lamp unit and the extensions thereof.

23. The projector light assembly of claim 17, wherein the socket structure and the clip together define a circular slot.

24. The projector light assembly of claim 23, wherein the socket structure further includes at least one stop in the circular slot for limiting a range of rotational movement of a component of a lamp unit in the circular slot.

25. The projector light assembly of claim 23, wherein the socket structure further includes at least one ramp in the circular slot to allow rotational movement of a component of a lamp unit in the circular slot in one direction while resisting rotational movement of the component in an opposite direction.

26. The projector light assembly of claim 17, wherein the auxiliary reflector is attached to the shade and includes a reflective first surface that reflects light from the second section of the primary reflector and a second surface that prevents light reflected by a third section of the primary reflector from reaching the first portion of the lens.

* * * * *